March 31, 1925. 1,531,495
G. W. MOORE
WORM WHEEL BEARING FOR HAIR CLIPPERS AND THE LIKE
Filed Oct. 28, 1922

Witnesses:

Inventor:
George W. Moore
By Joshua R H Potts
His Attorney

Patented Mar. 31, 1925.

1,531,495

UNITED STATES PATENT OFFICE.

GEORGE W. MOORE, OF CHICAGO, ILLINOIS.

WORM-WHEEL BEARING FOR HAIR CLIPPERS AND THE LIKE.

Application filed October 28, 1922. Serial No. 597,652.

*To all whom it may concern:*

Be it known that I, GEORGE W. MOORE, a citizen of the United States, and a resident of the city of Chicago, county of Cook, and State of Illinois, have invented certain new and useful Improvements in Worm-Wheel Bearings for Hair Clippers and the like, of which the following is a specification.

My invention relates to improvements in worm wheel bearings for hair clippers and the like, the object of the invention being to provide a simple and efficient bearing of this character which is durable and efficient in use and may be readily renewed if worn.

Other objects will appear hereinafter.

The invention consists in the combinations and arrangements of parts hereinafter described and claimed.

Figure 1:
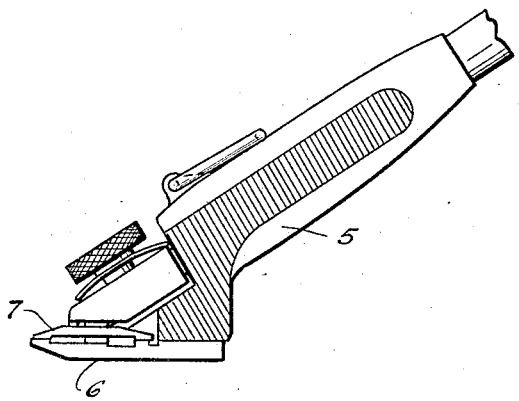
Figure 2:
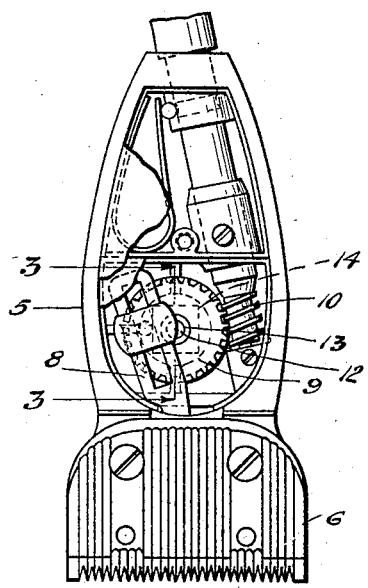
Figure 3:
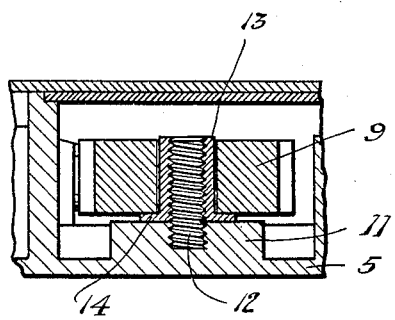
Figure 4:
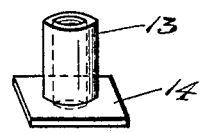

The invention will be best understood by reference to the accompanying drawings forming a part of this specification and in which, Fig. 1, is a side view of a hair clipper equipped with a bearing embodying the invention, Fig. 2, is a bottom plan view of the same with the closure plate removed, Fig. 3, is an enlarged section taken substantially on line 3—3 of Fig. 2, and Fig. 4, is a perspective view of a bearing sleeve employed in the construction.

The preferred form of construction as illustrated in the drawings comprises a hollow handle or casing 5, carrying a cutter head 6 and a reciprocating cutter blade 7 operated by a lever 8 which in turn is operated by a worm wheel 9 driven by a worm shaft 10. So much of the construction constitutes no part of my present invention except in so far as the same co-operates with the parts to be presently described.

The present invention relates particularly to the bearing provided for the worm wheel, 9. To this end the worm wheel 9 is made of composition material such as bakelite adapted to the purpose and also adapted to constitute in itself an efficient bearing. To support the worm wheel 9, I provide a supporting boss 11 formed integrally with the metal casing 5 preferably by casting the same from metal in the form of a die casting. The boss 11 is provided with a threaded socket terminating in the wall of the casing. A threaded stud 12 is secured in and projects from the boss 11 abutting against the bottom of said boss and a threaded sleeve 13 is removably mounted on said stud, and provided with a bearing collar or flange 14 resting on the boss 11 as shown. The sleeve 13 and collar 14 are formed of hardened steel well adapted to constitute a bearing for the worm wheel 9 and the worm wheel is provided with a central bore loosely fitting the sleeve 13 and turning freely thereon.

By this arrangement a simple and efficient bearing is provided for the worm wheel which my be readily renewed in case of wear.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination with a support, of a stud rigidly secured to said support and projecting therefrom, said stud being of substantially uniform diameter and threaded throughout its entire effective length; and a bearing sleeve threaded on said stud and seating against the support, whereby said bearing sleeve may be removed or replaced without disturbing said stud, substantially as described.

2. The combination with a support having a threaded socket terminating therein, of a threaded stud in said socket and seating against the bottom thereof, said stud being of substantially uniform diameter and threaded from end to end; and a bearing sleeve threaded on said stud and seating against the wall of said casing, whereby said sleeve may be removed or replaced without disturbing said stud, substantially as described.

3. In a hair clipper the combination of a metallic casing having a supporting boss formed integral with a wall thereof, said supporting boss being provided with a threaded socket terminating in the wall of the casing; a threaded stud threaded in said socket and seating against the bottom thereof and projecting into said casing, said stud being of uniform diameter and threaded from end to end; a bearing sleeve threaded on said stud and having an integral bearing collar seating on said boss, whereby said bearing sleeve may be removed or replaced without disturbing said stud; and a worm wheel of composition material loosely mounted on said sleeve, substantially as described.

In testimony whereof I have signed my name to this specification in the presence of two subscribing witnesses.

GEORGE W. MOORE.

Witnesses:
 JOSHUA R. H. POTTS,
 FREDA C. APPLETON.